March 18, 1969  J. V. FOSTER  3,434,081
ARMATURE RETAINER FOR RELAYS WITH CLAPPER TYPE ARMATURE
Original Filed Dec. 8, 1966  Sheet 2 of 2

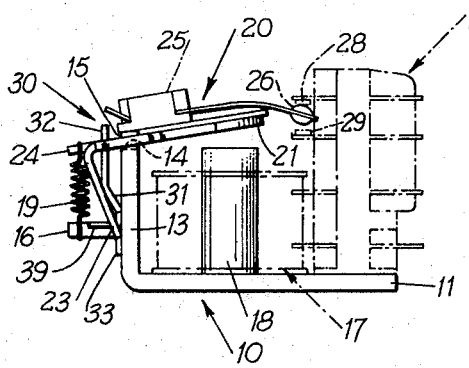

INVENTOR.
JACK V. FOSTER
BY Charles J. Worth
AGENT

United States Patent Office 3,434,081
Patented Mar. 18, 1969

3,434,081
ARMATURE RETAINER FOR RELAYS WITH CLAPPER TYPE ARMATURE
Jack V. Foster, Fort Branch, Ind., assignor to American Machine & Foundry Company, a corporation of New Jersey
Continuation of application Ser. No. 600,088, Dec. 8, 1966. This application May 20, 1968, Ser. No. 732,006
U.S. Cl. 335—203                        19 Claims
Int. Cl. H01h 9/00, 50/18

ABSTRACT OF THE DISCLOSURE

A relay including a retaining member to prevent inadvertent disengagement of a clapper type armature from the bearing end of a support leg, said retaining member being loosely interconnected to the armature and the support leg.

---

Figure 5:
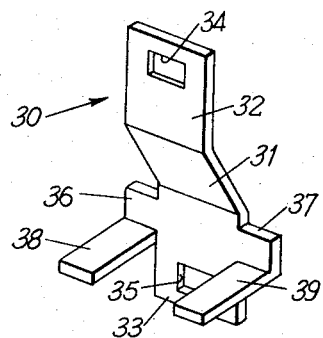

This application is a continuation of Ser. No. 600,088, filed Dec. 8, 1966.

This invention relates generally to electromagnetic relays of the clapper type and more particularly to the pivotal interconnections between the armatures and frame pieces thereof.

The general construction of this type of relay is shown in U.S. Patent 3,051,804 granted Aug. 28, 1962, to L. H. Mayer and U.S. Patent 3,201,541 granted Aug. 17, 1965, to W. J. Richert, both of which are assigned to the same assignee as is the present application.

As shown in each of the aforementioned patents, an armature is pivotally supported on the free end of one leg of an L-shaped frame piece, and generally retained in place by a pair of lugs extending from the supporting leg through openings in the armature. A bracket is fitted on the supporting leg to provide a projection for engaging one end of a tail spring which is engaged at its other end by a projection extending from the armature. The bracket has a pair of tabs which are bent to engage notches in the supporting leg and provide an interlock therebetween, and a central upwardly extending leg which protrudes through a slot in the armature and is bent to provide a catch which prevents the armature from becoming disengaged from the lugs extending from the end of the supporting leg.

The provision of such a bracket requires costly machining because of tolerances which must be closely held. Other means for constraining an armature pivot axis such as hinges, and brackets which are attached to either the leg or armature are costly and relatively difficult to manufacture and also make assembly of the relay difficult.

Accordingly, an object of the present invention is to provide a relay of the type described with a relatively simple and inexpensive retaining member to prevent inadvertent disengagement of a clapper type armature from the bearing end of a support leg.

Another object of the present invention is to provide the foregoing relay wherein the retaining member is loosely interconnected to the armature and the support leg.

And another object of the present invention is to provide the foregoing relay wherein the retaining member has a pair of spaced parallel arms disposed between a pair of spaced tails extending from the armature, and extending along the paths of travel of the tails when the armature pivots to provide guide rails for the moving tails to prevent cocking of the pivoting armature.

And still another object of the present invention is to provide a relay of the type described having a relatively simple restraining member which eliminates costly machining and difficult assembly of parts while providing a positive constraint of the pivot axis of the armature.

The present invention contemplates an electromagnetic relay having the combination comprising: an L-shaped frame piece providing a base leg and a support leg substantially perpendicular to one another; an electromagnet core connected at one end to the base leg and disposed substantially parallel to the support leg; said support leg providing a transverse bearing surface at its free end, and having a projection spaced from the bearing surface and extending in a direction away from the core in a plane substantially parallel to the base leg; said bearing surface and the free end of the core being disposed in a common plane substantially parallel to the base leg; a clapper type armature extending over the free end of the core, and having a fulcrum end engaging the bearing surface and being pivotal thereon; said armature and support leg having interengaging means to prevent displacement of the armature relative to the support leg while permitting the armature to pivot on the bearing surface; said armature having a pair of tails extending from the fulcrum end spaced transversely from one another, and a projection spaced between the tails and substantially coextensive with the projection of the support leg; said tails being substantially parallel to one another and extending from the armature at an angle so the free ends thereof engage the support leg on both sides of its projection and limit the pivoting of the armature away from the free end of the core; an elongated retaining member loosely mounted on both of the projections limiting movement of the armature away from the bearing surface and preventing separation of the interengaging means; a tail spring having its ends engaged and retained in tension by the projections and biasing the armature to pivot on the bearing surface away from the free end of the core and keeping the retaining member loosely mounted on the projections; a pair of guide means spaced transversely from one another each disposed on one side of the projection of the support leg and adjacent one of the tails; and each of the guide means extending along the path of movement of the adjacent tail to prevent cocking of the armature.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 6:
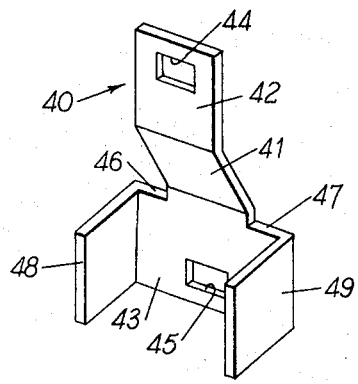
Figure 7:
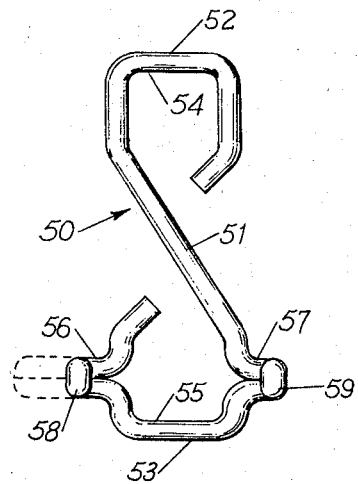
Figure 8:
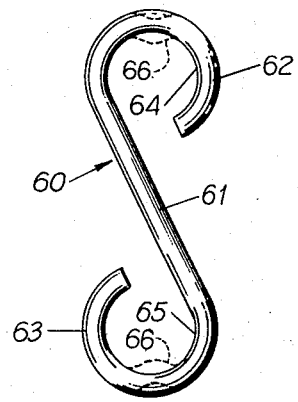
Figure 9:
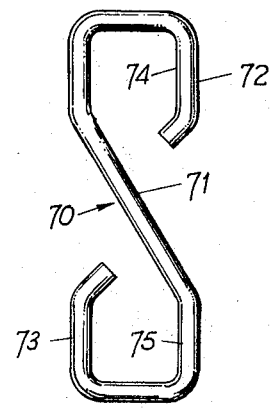

FIGURE 1 is a side elevational view of a relay made in accordance with the present invention, with portions thereof shown in phantom, FIGURE 2 is an end elevation of the relay of FIGURE 1 with the portions shown in phantom in FIGURE 1 eliminated herefrom, FIGURE 3 is a top plan view of the portions of the relay of FIGURE 2, FIGURE 4 is a sectional view taken on line 4—4 of FIGURE 2, FIGURES 5 and 6 are enlarged perspective views of the armature retainer of FIGURES 1 to 4 and a modification thereof, respectively, and FIGURES 7 to 9 are enlarged elevational views of a wire-form modification of the retainer of FIGURES 5 and 6, and basic forms thereof.

Referring now to the drawings and particularly to FIGURES 1 to 4, the general construction of the relay is substantially the same as shown in the aforementioned Patents 3,051,804 and 3,201,541, and comprises a frame piece 10 of magnetic material, an electromagnet 17, an armature 20, and a contact and terminal board assembly which may be of the type shown, described and claimed in U.S. Patent 3,210,453 which was granted Oct. 5, 1965 to Z. R. Smith and is assigned to the same assignee as is the present application.

The frame piece 10, of magnetic material, is L-shaped to provide a base leg 11 and a support leg 13 which are substantially perpendicular to each other. The core 18 of the electromagnet 17 is fixedly connected at one end to the base leg 11 intermediate its free end and support leg 13. As is indicated in FIGURE 1, a contact and terminal board 27 of dielectric material for supporting one or more pairs of spaced, fixed contacts 28 and 29 is mounted on the free end of leg 11 which has an opening, as shown in FIGURE 4, for a fastener (not shown) which completes the coupling therebetween.

Support leg 13 is substantially parallel to the core 18 and has a transverse bearing end surface 14 which lies in substantially the same plane as the free end of core 18; said plane being substantially parallel to the base leg 11. The support leg 13 also is provided with a pair of spaced lugs 15 which extend from the bearing surface 14, and a projection 16 intermediate its ends and which extends in a direction away from the electromagnet 17 and in a plane substantially parallel to leg 11. Projection 16 is preferably stamped from leg 13, as is best shown in FIGURE 4, or may be provided in any other suitable way well known in the art.

Armature 20 is comprised primarily of a clapper 21 of magnetic material, and a block assembly 25 of dielectric material which mounts one spring arm contact 26 for each pair of fixed contacts 28 and 29. Clapper 21 extends across the free end of core 18 and has a fulcrum end provided with a pair of spaced slots or openings 22 so aligned to receive lugs 15, and a projection 24 which is substantially coextensive with projection 16 of leg 13. A tail spring 19 is provided under tension with its ends engaged by projections 16 and 24 to spring bias armature 20 to pivot at its fulcrum end to space the clapper 21 from the free end of core 18 and move each of the spring contacts 26 into engagement with the corresponding fixed contact 28.

To limit the amount of pivotal movement of the armature 20 under the bias of tail spring 19, a pair of tail members 23 are provided each being spaced from the projection 24 and extending parallel to the other from the fulcrum end along one side of the clapper 21. The tail members 23 are disposed at an angle relative to the clapper 21 so the free ends thereof engage the support leg 13 on both sides of projection 16 when the armature 20 is pivoted to a desired normal position under the bias of tail spring 19. When the electromagnet 17 is energized, it attracts clapper 21 which causes armature 20 to pivot on the bearing surface 14 against the bias of spring 19 until the clapper engages the free end of core 18. This causes contacts 26 to move out of engagement with contacts 28 and into engagement with contacts 29. Tail spring 19 urges armature 20 to return to its original normal position when electromagnet 17 is de-energized.

It will be seen that armature 20 is retained in position on the end of leg 13 by the spring forces of tail spring 19 and spring contacts 26 when in its normal or unactuated position, and by the spring bias of tail spring 19 and the magnetic attraction of electromagnet 17 when in the actuated position. To prevent inadvertent disengagement and/or cocking of armature 20, a retaining member 30 is provided which is stamped from thin sheet spring metal.

As best shown in FIGURE 5, retaining member 30 has an elongated body with a central body portion 31 which offsets the resulting end body portions 32 and 33 from one another so they are disposed in spaced substantially parallel planes. The body end portions 32 and 33 have respective openings 34 and 35 which are larger in size than the cross-sectional size of projections 24 and 16, respectively. The mean distance between openings 34 and 35 is substantially equal to the mean distance between projections 24 and 16.

When the relay is assembled and projections are inserted through openings 34 and 35, respectively, the body end portion 33 is permitted to lie flat against the support leg 13 while the jogged body portion 31 causes the body end portion 32 to be spaced from the pivot formed between the fulcrum end of clapper 21 and bearing surface 14. Because of the oversize of openings 34 and 35 and the space therebetween, retaining member is loosely mounted on projections 24 and 16 permitting only limited movement of clapper 21 from bearing surface 14 which is insufficient for separation or disengagement of lugs 15 from openings 22 in the armature. The tail spring 19 which is engaged by projections 24 and 16 prevents inadvertent removal of retaining member 30 from the relay.

Retaining member 30 is provided with a pair of shoulder portions 36 and 37 which extend laterally each from one side of body end portion 33. The width of member 30 across the shoulder portions 36 and 37 is slightly less than the distance between the pair of tails 23 of clapper 21, as shown in FIGURE 2. Shoulders 36 and 37 have arms 38 and 39, respectively, which are substantially parallel to one another and extend along a common transverse plane substantially parallel to the base leg 11 and in a direction away from electromagnet 17.

Thus, arms 38 and 39 are disposed between and adjacent the inner edges of tails 23 toward the free ends thereof, and extend along their paths of movement when armature 20 is pivoted. If, in any position, the armature 20 tends to cock one of the tails 23 would contact on one of the arms 38 or 39 which act as guide rails. Should body end portion 33 be urged laterally, however, the limited possible movement would keep such cocking of the armature 20 to a minimum.

A modified retaining member 40 is shown in FIGURE 6 and has a jogged central body portion 41 and body end portions 42 and 43 corresponding to body portions 31, 32 and 33, respectively, of retaining member 30. Member 40 also has a pair of spaced oversize openings 44 and 45 and a pair of shoulders 46 and 47 which also correspond to openings 34 and 35 and shoulders 36 and 37 of member 30. Shoulders 46 and 47 have arms 48 and 49 corresponding to arms 38 and 39. Although arms 48 and 49 are substantially parallel to one another and extend in a direction away from electromagnet 17, in this instance the arms are disposed in substantially parallel planes which are normal or perpendicular to the base leg 11.

A modified retaining member 50 corresponding to members 30 and 40 is shown in FIGURE 7 as being a wireform member. A wireform member 70 being the basic shape of member 50 and having no arms nor shoulders is shown in FIGURE 9 while a modification thereof is shown in FIGURE 8.

The wireform member 70 as is shown in FIGURE 9 has an elongated diagonal portion 71 with looped ends 72 and 73 which correspond to portions 31, 32 and 33, respectively, of member 30 or portions 41, 42 and 43, respectively, of member 40. The loops or looped ends 72 and 73 which define openings 74 and 75, respectively, each have a pair of spaced substantially linear or straight parallel portions connected by a substantially straight transverse portion.

The wireform member 60 is a modification of member 70 and has a diagonal portion 61 with looped end portions 62 and 63 which correspond to portions 71, 72 and 73, respectively. The looped end portions 62 and 63 are, in this instance, generally circular and define openings 64 and 65, respectively, corresponding to openings 74 and 75. The loops 64 and 65 each may be deformed inwardly to provide a bearing surface 66 to engage the flat surface, not the edges, of one of the projections 16 or 24.

Referring now to FIGURE 7, member 50 has a diagonal portion 51 with looped end portions 52 and 53 which correspond and conform in shape to portions 71, 72 and 73, respectively, of member 70. Looped portions 52 and 53 define openings 54 and 55, respectively, which correspond to openings 74 and 75.

In this instance, the straight parallel portions of loop 53 are bent laterally away from one another and then folded back each upon itself to provide shoulder portions 56 and 57 which correspond to shoulder portions 36 and 37 of member 30 or shoulder portions 46 and 47 of member 40. The outer ends of portions 46 and 47 are bent forwardly and substantially perpendicular to the plane of member 50 to provide a pair of spaced substantially parallel arms 58 and 59 which correspond to arms 38 and 39 of member 30 or arms 48 and 49 of member 40.

It should be noted that diagonal portions 51, 61 and 71 may be bent as are portions 31 and 41 to provide a central jog to offset the end portions from each other of members 50, 60 and 70, respectively.

Although several embodiments of the invention have been illustrated and described in detail, it is to be expressly understood that the invention is not limited thereto. Various changes in the design and arrangement of parts may be made without departing from the spirit and scope of the invention as the same will now be understood by those skilled in the art.

What is claimed is:

1. In a clapper type relay including an armature having a fulcrum end with a pair of substantially parallel transversely spaced tails and a projection therebetween extending from the fulcrum end thereof, a frame piece support leg with a free end providing a transverse bearing surface engaged by said fulcrum end pivotally supporting said armature and a projection spaced from said bearing surface and substantially co-extensive with said projection of said armature, interengaging means for preventing displacement of said fulcrum end from said bearing surface while permitting said armature to pivot, a tail spring retained in tension having its ends engaged by said projections and biasing said armature to pivot, and said tails extending at an angle from said armature and providing free ends thereof engaging said leg on both sides of its projection limiting pivotation of said armature in response to the bias of said tail spring; means for limiting movement of said armature from said bearing surface thereby preventing separation of said interengaging means, comprising:
    an elongated retaining member loosely mounted on both of said projections and retained thereon by said tail spring;
    a pair of guide means spaced transversely from one another each disposed on one side of said projection of said support leg and adjacent one of said tails; and
    each of said guide means extending along the path of movement of said adjacent tail to prevent cocking of said armature.

2. In a clapper type relay including an armature having a fulcrum end with a pair of substantially parallel transversely spaced tails and a projection therebetween extending from the fulcrum end thereof, a frame piece support leg with a free end providing a transverse bearing surface engaged by said fulcrum end pivotally supporting said armature and a projection spaced from said bearing surface and substantially co-extensive with said projection of said armature, interengaging means for preventing displacement of said fulcrum end from said bearing surface while permitting said armature to pivot, a tail spring retained in tension having its ends engaged by said projections and biasing said armature to pivot, and said tails extending at an angle from said armature and providing free ends thereof engaging said leg on both sides of its projection limiting pivotation of said armature in response to the bias of said tail spring; means for limiting movement of said armature from said bearing surface thereby preventing separation of said interengaging means, comprising:
    an elongated retaining member loosely mounted on both of said projections and retained thereon by said tail spring;
    said retaining member being of sheet material having a pair of spaced openings one in each end thereof;
    one of said projections extending through each of said openings which is larger in size than the cross-sectional size of said projection extending therethrough; and
    the mean distance between said spaced openings being substantially equal to the mean distance between said projections.

3. The relay in accordance with claim 2, and said retaining member further comprising:
    a pair of shoulder portions disposed at one end of the body and extending laterally therefrom;
    a pair of spaced arms disposed between the tails and substantially parallel to one another, each extending from one of the shoulder portions in a direction away from the core;
    each of said spaced arms being disposed adjacent one of the tails along its path of travel when the armature pivots providing a pair of guide rails to be engaged by the tails to prevent the armature from cocking.

4. The relay in accordance with claim 3, wherein:
    said pair of spaced arms are disposed in a common plane substantially parallel to the base leg.

5. The relay in accordance with claim 3, wherein:
    said pair of spaced arms are disposed in parallel planes which are substantially perpendicular to the base leg.

6. The relay in accordance with claim 2, wherein:
    said elongated body having a jog intermediate its ends and offsetting the end thereof one from another each in a plane spaced from and parallel to the plane of the other; and
    one of the ends of the body being positioned adjacent the support leg and the other of the ends of the body being spaced from the fulcrum end of the armature.

7. The relay in accordance with claim 6, and said retaining member further comprising:
    a pair of shoulder portions extending laterally from the end of the body disposed adjacent the support leg;
    a pair of spaced arms disposed between the tails and substantially parallel to one another, each extending from one of the shoulder portions in a direction away from the core;
    each of said spaced arms being disposed adjacent one of the tails along its path of travel when the armature pivots providing a pair of guide rails to be engaged by the tails to prevent the armature from cocking.

8. The relay in accordance with claim 7, wherein:
    said pair of spaced arms are disposed in a common plane substantially parallel to the base leg.

9. The relay in accordance with claim 7, wherein.
    said pair of spaced arms are disposed in parallel planes which are substantially perpendicular to the base leg.

10. In a clapper type relay including an armature having a fulcrum end with a pair of substantially parallel transversely spaced tails and a projection therebetween extending from the fulcrum end thereof, a frame piece support leg with a free end providing a transverse bearing surface engaged by said fulcrum end pivotally supporting said armature and a projection spaced from said bearing surface and substantially co-extensive with said projection of said armature, interengaging means for preventing displacement of said fulcrum end from said bearing surface while permitting said armature to pivot, a tail spring retained in tension havings its ends engaged by said projections and biasing said armature to pivot, and said tails extending at an angle from said armature and providing free ends thereof engaging said leg on both sides of its projection limiting pivotation of said armature in response to the bais of said tail spring; means for limiting movement of said armature from said bearing surface thereby preventing separation of said interengaging means, comprising:
- an elongated retaining member loosely mounted on both of said projections and retained thereon by said tail spring;
- said retaining member being a wireform having an elongated intermediate portion with looped end portions defining a pair of spaced openings for passage of said projections therethrough.

11. The relay in accordance with claim 10, wherein:
each of said end portions is a substantially circular loop with an inwardly extending deformation axially opposite the deformation of the other loop.

12. The relay in accordance with claim 10, wherein:
each of said end portions is a loop having a plurality of flat portions in series each being angularly offset from the flat portions adjacent thereto.

13. The relay in accordance with claim 10, and said retaining member further comprising:
- a pair of shoulder portions disposed at one end of the body and extending laterally from one of said looped end portions;
- a pair of spaced arms disposed between the tails and substantially parallel to one another, each extending from one of the shoulder portions in a direction away from the core;
- each of said spaced arms being disposed adjacent one of the tails along its path of travel when the armature pivots providing a pair of guide rails to be engaged by the tails to prevent the armature from cocking.

14. The relay in accordance with claim 13, wherein:
said pair of spaced arms are disposed in a common plane substantially parallel to the base leg.

15. The relay in accordance with claim 13, wherein:
said pair of spaced arms are disposed in parallel planes which are substantially perpendicular to the base leg.

16. The reilay in accordance with claim 10, wherein:
said elongated portion having a jog intermediate its ends and offseting the looped end portions one from another each in a plane spaced from and parallel to the plane of the other; and
one of the ends of the body being positioned adjacent the support leg and the other of the ends of the body being spaced from the fulcrum end of the armature.

17. The relay in accordance with claim 16, and said retaining member further comprising:
- a pair of shoulder portions extending laterally from the end of the body disposed adjacent the support leg;
- a pair of spaced arms disposed between the tails and substantially parallel to one another, each extending from one of the shoulder portions in a direction away from the core;
- each of said spaced arms being disposed adjacent one of the tails along its path of travel when the armature pivots providing a pair of guide rails to be engaged by the tails to prevent the armature from cocking.

18. The relay in accordance with claim 17, wherein:
said pair of spaced arms are disposed in a common plane substantially parallel to the base leg.

19. The relay in accordance with claim 17, wherein:
said pair of spaced arms are disposed in parallel planes which are substantially perpendicular to the base leg.

References Cited

UNITED STATES PATENTS 3,210,499  10/1965  Sosnoski _____ 335—203 XR

FOREIGN PATENTS 347,726  4/1931  Great Britain.
1,163,270  4/1958  France.

GEORGE HARRIS, *Primary Examiner.*

U.S. Cl. X.R.

335—276